(12) United States Patent
Liu et al.

(10) Patent No.: US 8,288,673 B2
(45) Date of Patent: Oct. 16, 2012

(54) ILLUMINATED LAPTOP KEYBOARD WITH UNIFORM ILLUMINATION

(75) Inventors: Yung-Lung Liu, Taichung Hsien (TW); Shih-Pin Lin, Taichung Hsien (TW)

(73) Assignee: Sunrex Technology Corp., Taichung (TW)

( * ) Notice: Subject to any disclaimer, the term of this patent is extended or adjusted under 35 U.S.C. 154(b) by 411 days.

(21) Appl. No.: 12/652,941

(22) Filed: Jan. 6, 2010

(65) Prior Publication Data

US 2011/0162944 A1 Jul. 7, 2011

(51) Int. Cl.
*H03K 17/975* (2006.01)
(52) U.S. Cl. .......................... 200/600; 200/314
(58) Field of Classification Search ............. 200/600
See application file for complete search history.

(56) References Cited

U.S. PATENT DOCUMENTS

| 7,173,204 B2 * | 2/2007 | Schmidt et al. ............... 200/310 |
| 7,935,904 B2 * | 5/2011 | Song ............................ 200/310 |
| 2007/0039809 A1 * | 2/2007 | Aihara et al. ................. 200/310 |

* cited by examiner

*Primary Examiner* — Renee S Luebke
*Assistant Examiner* — Lheiren Mae Caroc

(57) ABSTRACT

A laptop keyboard in one embodiment includes a rectangular key printing film formed of an optically transmissive material and comprising keys; a rectangular luminescent sheet formed of optically transmissive silicone rubber, the luminescent sheet being mounted below the key printing film; an LED light source disposed to a side of the luminescent sheet; and a capacitive layer mounted below the luminescent sheet and comprising an insulative layer and pairs of upper and lower conductors wherein a pressing of the key changes capacitance of the pair of upper and lower conductors for typing or performing a predetermined command. Light emitted by the LED light source is directed to the luminescent sheet which in turn directs the light upward toward the key printing film.

11 Claims, 4 Drawing Sheets

ILLUMINATED LAPTOP KEYBOARD WITH UNIFORM ILLUMINATION

BACKGROUND OF THE INVENTION

1. Field of Invention

The invention relates to laptop components and more particularly to a laptop having a keyboard with an LED (light-emitting diode) light source capable of uniformly illuminating keys.

2. Description of Related Art

A conventional laptop has a touchpad provided to the right or the front of an integrated keyboard. However, it is not convenient to use the touchpad since its surface area is small. Split type touchpad is another option. However, it can consume precious space and thus it is not desirable.

It is known that keyboard of a laptop is small and the touchpad thereof is even smaller. However, the touchpad may still occupy a certain surface portion of the keyboard. In addition, a person may have difficulties of operating a keyboard in a dark environment because keyboards of most conventional laptops are not backlit.

A type of laptop having its keyboard with LED (light-emitting diode) members mounted thereunder has been commercially available. However, illumination between one key and an LED light source may be different from that between another key and the LED light source. Hence, keys illumination is not uniform with some distal keys being poorly lit. This is not desirable since it may hinder operation. Thus, it is desirable to provide a novel illuminated laptop keyboard with uniform illumination in order to overcome the inadequacies of the prior art.

SUMMARY OF THE INVENTION

It is therefore one object of the invention to provide an illuminated laptop keyboard with uniform illumination.

In one aspect of the invention there is provided a keyboard mounted on a keyboard housing of a laptop having a hinged cover and a display on an inner surface of the cover, comprising a rectangular key printing film formed of an optically transmissive material and comprising a plurality of keys with characters printed thereon; a rectangular luminescent sheet formed of optically transmissive silicone rubber, the luminescent sheet being mounted below the key printing film; an LED (light-emitting diode) light source disposed to a side of the luminescent sheet; and a capacitive layer mounted below the luminescent sheet and comprising an insulative layer and a plurality of pairs of upper and lower conductors wherein a pressing of the key changes capacitance of the pair of upper and lower conductors for typing or performing a predetermined command, wherein light emitted by the LED light source is directed to the luminescent sheet which in turn directs the light upward toward the key printing film.

In another aspect of the invention there is provided a keyboard mounted on a keyboard housing of a laptop having a hinged cover and a display on an inner surface of the cover, comprising a rectangular key printing film formed of an optically transmissive material and comprising a plurality of keys with characters printed thereon; a rectangular luminescent layer formed of optically transmissive silicone rubber, the luminescent layer being mounted below the key printing film and comprising a plurality of spaced bottom cavities, each cavity corresponding to the key thereabove and the pair of upper and lower conductors therebelow; an LED (light-emitting diode) light source disposed to a side of the luminescent sheet; and a capacitive layer mounted below the luminescent sheet and comprising an insulative layer and a plurality of pairs of upper and lower conductors wherein a pressing of the key changes capacitance of the pair of upper and lower conductors for typing or performing a predetermined command, wherein light emitted by the LED light source is directed to the luminescent sheet which in turn directs the light upward toward the key printing film.

In a further aspect of the invention there is provided a keyboard mounted on a keyboard housing of a laptop having a hinged cover and a display on an inner surface of the cover, comprising a rectangular key printing film formed of an optically transmissive material and comprising a plurality of keys with characters printed thereon; a rectangular luminescent layer formed of optically transmissive silicone rubber, the luminescent layer being mounted below the key printing film and comprising a plurality of spaced bottom cavities, each cavity corresponding to the key thereabove and the pair of upper and lower conductors therebelow, and a plurality of groups of recesses, each group of recesses being disposed on a top of each of the cavities wherein the recesses of one group have a depth different from that of an adjacent group, and the number of the recesses of one group is different from that of the recesses of the other group; an LED (light-emitting diode) light source disposed to a side of the luminescent sheet; and a capacitive layer mounted below the luminescent sheet and comprising an insulative layer and a plurality of pairs of upper and lower conductors wherein a pressing of the key changes capacitance of the pair of upper and lower conductors for typing or performing a predetermined command, wherein light emitted by the LED light source is directed to the luminescent sheet which in turn directs the light upward toward the key printing film by passing through the recesses.

The above and other objects, features and advantages of the invention will become apparent from the following detailed description taken with the accompanying drawings.

DETAILED DESCRIPTION OF THE INVENTION

Figure 1:
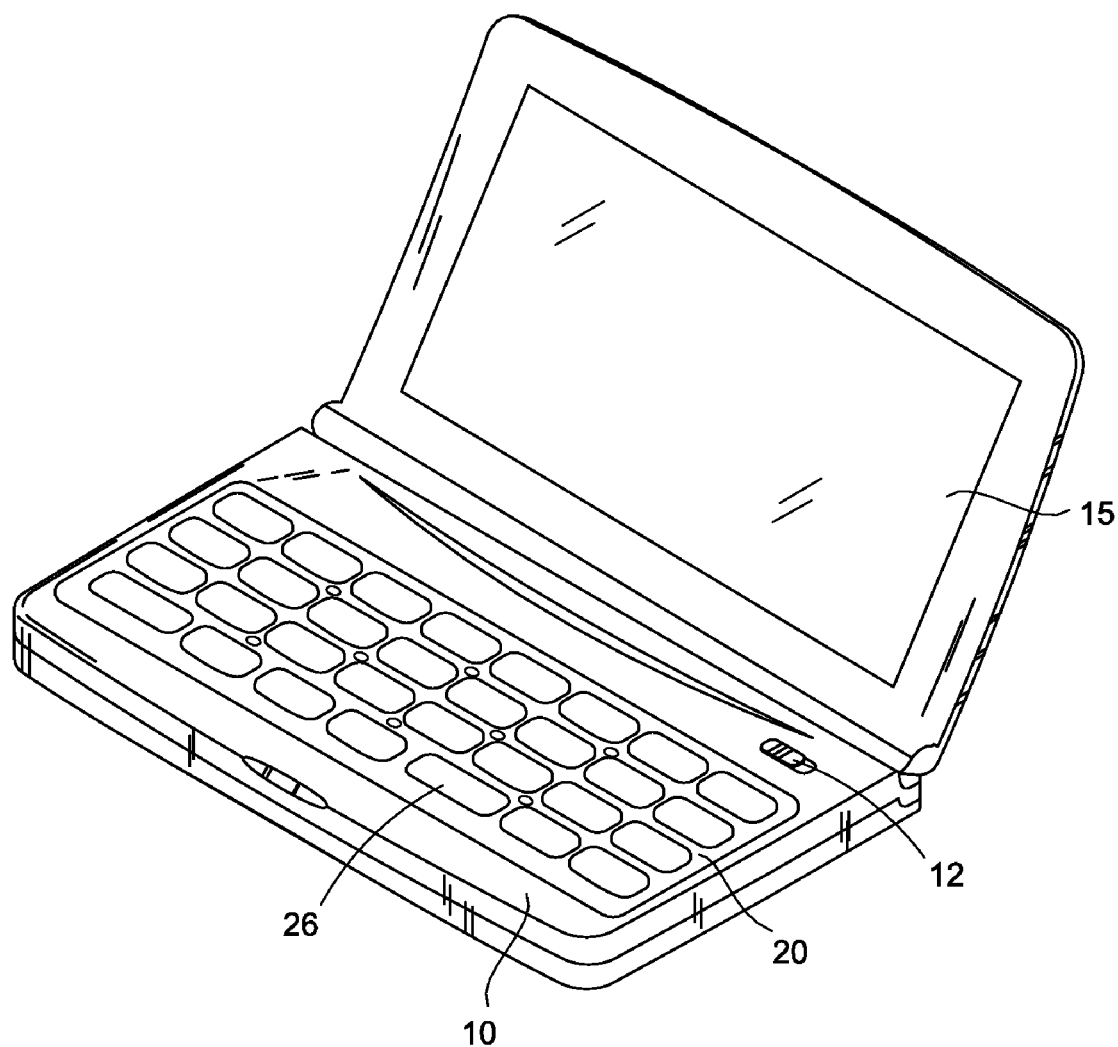
FIG. 1 is a perspective view of laptop having a first preferred embodiment keyboard according to the invention where the laptop is open.
Figure 2:
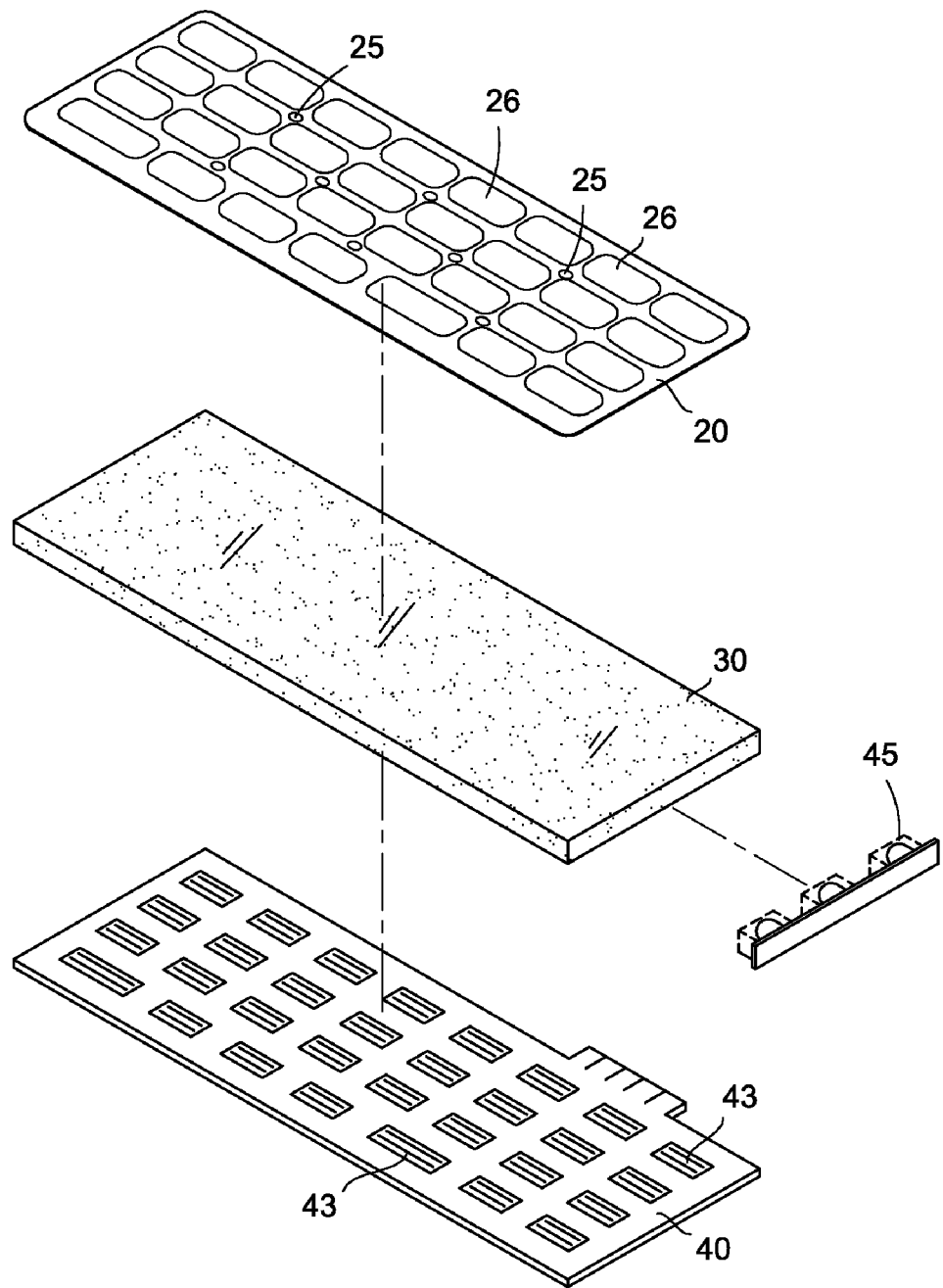
FIG. 2 is an exploded view of the keyboard.
Figure 3:
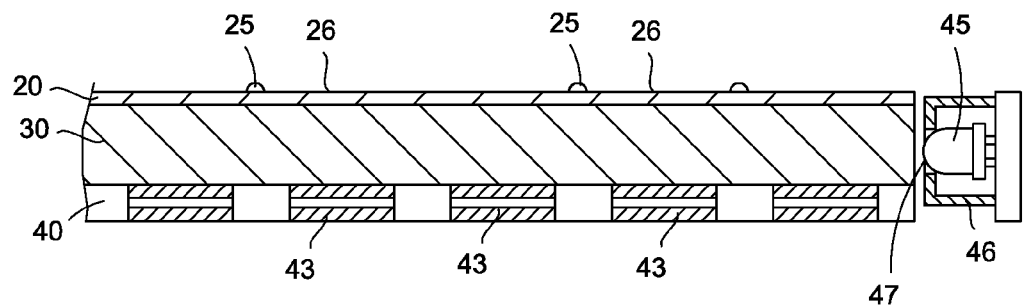
FIG. 3 is a longitudinal sectional view of the assembled keyboard.

Referring to FIGS. 1 to 3, an illuminated laptop keyboard in accordance with a first preferred embodiment of the invention is shown. The keyboard is capacitive and is mounted on a keyboard housing 10. A sliding button 12 is provided on the right top corner of the keyboard housing 10. A display 15 is provided on an inner surface of a hinged cover which is adapted to close onto the keyboard housing 10 when the laptop is not in use or open prior to using the laptop. The keyboard comprises the following components as discussed in detail below.

A key printing film 20 is rectangular and is optically transmissive. The key printing film 20 comprises a plurality of keys 26 including alphanumeric keys and function keys with characters printed thereon, and a plurality of half-spherical projections 25 each provided besides the key 26, the projections 25 having oblique or curve lines marked thereon as guide for key touch purposes. A user may press one of the keys 26 for typing or perform a specific command.

A luminescent sheet 30 is also a rectangle and is made of an optically transmissive material (e.g., silicone rubber) in order to allow light to pass and provide a degree of comfort to a user when the fingers press the keys 26. The luminescent sheet 30 is mounted below the key printing film 20.

An LED light source is shaped as a strip and is provided to the right of the luminescent sheet 30. The LED light source comprises a plurality of LED members 45 (e.g., three as shown) each enclosed by an opaque case 46 having an aperture 47 facing the luminescent sheet 30. Light emitted by the LED members 45 passes the apertures 47 to the luminescent sheet 30. The luminescent sheet 30 in turn direct the light upward toward the key printing film 20 for illumination.

A capacitive layer 40 is mounted below the luminescent sheet 30 and comprises an insulative layer (not numbered) and a plurality of pairs of upper and lower conductors 43. The capacitive layer 40 is a capacitive member. Hence, a pressing of the key 26 may change the capacitance of the pair of upper and lower conductors 43 to carry out typing or perform a predetermined command.

A user may slide the sliding button 12 to switch between typical mouse mode and typical keyboard mode. For example, for mouse mode the user may move the fingers on the surface of the keyboard to simulate mouse function. To the contrary, the user may slide the sliding button 12 to switch to typical keyboard mode.

Figure 4:
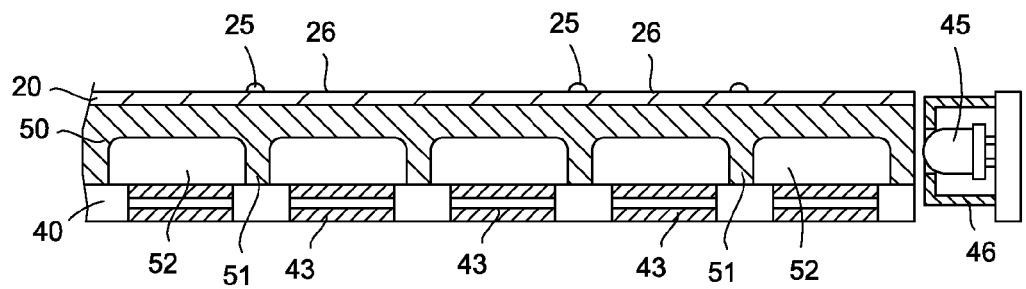
FIG. 4 is a view similar to FIG. 3 showing a second preferred embodiment keyboard according to the invention for laptop.
Figure 5:
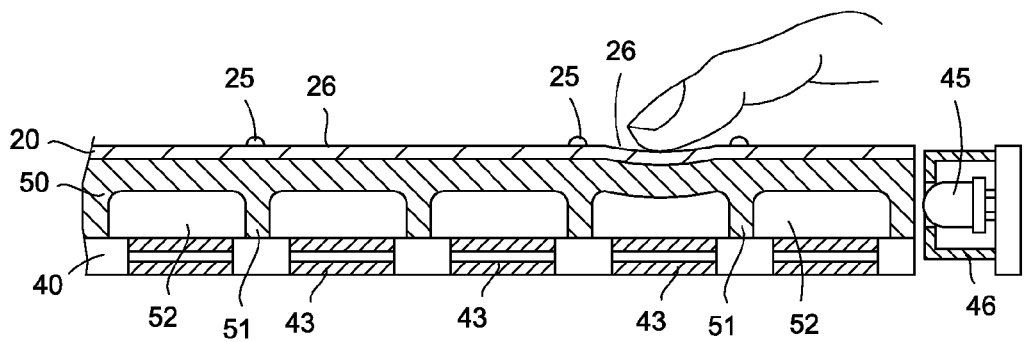
FIG. 5 is a view similar to FIG. 4 showing a key being pressed.

Referring to FIGS. 4 and 5, an illuminated laptop keyboard in accordance with a second preferred embodiment of the invention is shown. The characteristics of the second preferred embodiment are detailed below. The luminescent sheet 30 is replaced by a luminescent layer 50 having functions substantially the same as the luminescent sheet 30. The luminescent layer 50 is also a rectangle and is made of an optically transmissive material (e.g., silicone rubber). The luminescent layer 50 is mounted below the key printing film 20. A plurality of equally spaced cavities 52 are provided on a bottom of the luminescent layer 50. Each cavity 52 corresponds to the key 26 thereabove and the pair of upper and lower conductors 43 therebelow. A plurality of flanges 51 each is provided around the cavity 52. The flanges 51 have bottoms urged against the top of the capacitive layer 40. Hence, a user may press the key 26 to change the capacitance of the pair of upper and lower conductors 43 to carry out typing or perform a predetermined command.

Figure 6:
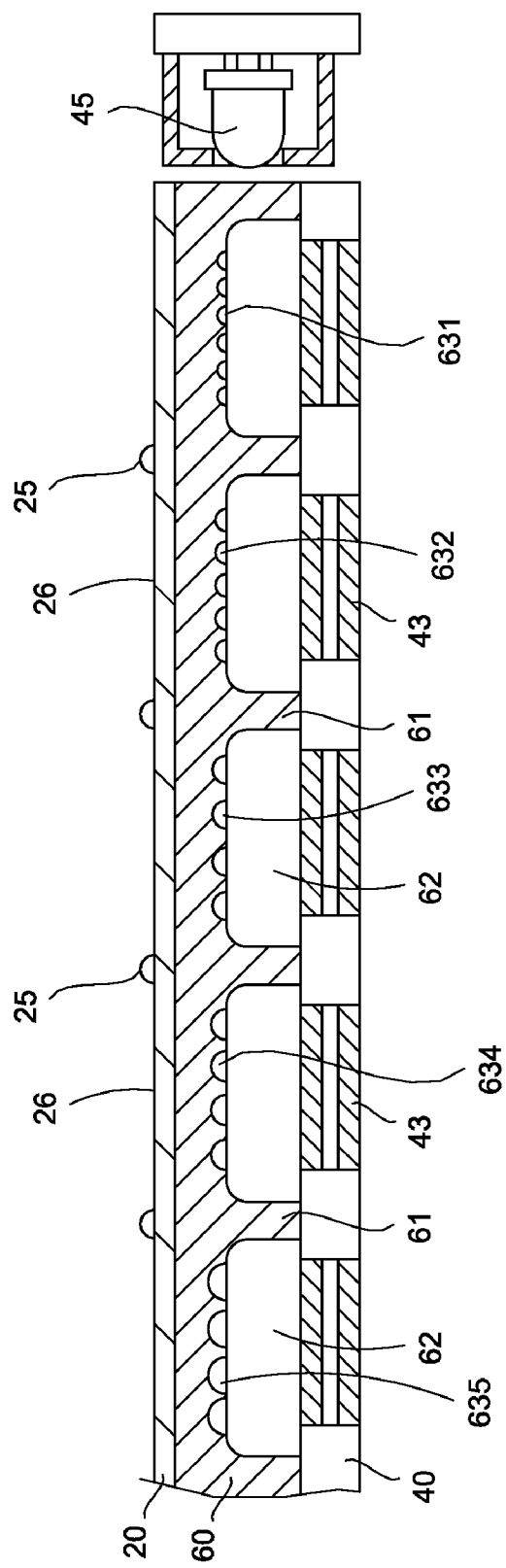
FIG. 6 is a view similar to FIG. 3 showing a third preferred embodiment keyboard according to the invention for laptop.

Referring to FIG. 6, an illuminated laptop keyboard 20 in accordance with a third preferred embodiment of the invention is shown. The characteristics of the third preferred embodiment are detailed below. The luminescent sheet 30 is replaced by a luminescent layer 60 having functions substantially the same as the luminescent sheet 30. The luminescent layer 60 is also a rectangle and is made of an optically transmissive material (e.g., silicone rubber). The luminescent layer 60 is mounted below the key printing film 20. A plurality of equally spaced cavities 62 are provided on a bottom of the luminescent layer 60. Each cavity 62 corresponds to the key 26 thereabove and the pair of upper and lower conductors 43 therebelow. A plurality of flanges 61 each is provided around the cavity 62. The flanges 61 have bottoms urged against the top of the capacitive layer 40. Hence, a user may press the key 26 to change the capacitance of the pair of upper and lower conductors 43 to carry out typing or perform a predetermined command.

Moreover, a plurality of groups of recesses 631, 632, 633, 634, and 635 are provided on tops of the cavities 62. The recesses of one group have a depth different from that of an adjacent one. Also, the number of recesses of one group is different from that of the other. For example, the recesses 635 are more distal than the recesses 631 relative to the LED members 45. Hence, the recesses 635 are designed to be more concave than the recesses 631. Also, the number of the recesses 635 is less than that of the recesses 631. Such configuration has the advantage of directing more light toward the recesses 635 than the recesses 631. And in turn, the light is directed upward from the circumferential surfaces of the recesses. But light reaching the recesses 635 may lose its intensity due to a relatively long traveling distance. Preferably, the depths of the recesses 631, 632, 633, 634, and 635 should be designed as being gradually increased and the number thereof should be designed as being gradually decreased in order to carry out a uniform illumination of all keys 26. That is, light intensity reaching the keys 26 is substantially the same irrespective of a distance between the specific key and the LED members 45.

The invention has the following advantages. The projections on the keyboard surface having oblique or curve lines marked thereon as guide are designed for key touch purposes. This feature is particularly suitable for using the laptop in a dark environment or for elderly and those having poor eyesight. The luminescent sheet 30 is made of an optically transmissive material (e.g., silicone rubber) in order to allow light to pass and provide a degree of comfort to a user when the fingers press the keys. The keyboard has typical mouse and keyboard integrated as a unit. Hence, it is more slim, compact, and lightweight and is space saving. The LED members, the key printing film, and the luminescent sheet or layer together carry out a uniform illumination of keys in use.

While the invention herein disclosed has been described by means of specific embodiments, numerous modifications and variations could be made thereto by those skilled in the art without departing from the scope and spirit of the invention set forth in the claims.

What is claimed is:

1. A keyboard mounted on a keyboard housing of a laptop having a hinged cover and a display on an inner surface of the cover, comprising:

a rectangular key printing film formed of an optically transmissive material and comprising a plurality of keys with characters printed thereon;

a rectangular luminescent layer formed of optically transmissive silicone rubber, the luminescent layer being mounted below the key printing film and comprising a plurality of spaced bottom cavities, each cavity corresponding to the key thereabove;

an LED (light-emitting diode) light source disposed to a side of the luminescent layer; and a capacitive layer mounted below the luminescent layer and comprising an insulative layer and a plurality of pairs of upper and lower conductors;

wherein each cavity corresponds to the pair of upper and lower conductors therebelow;

wherein a pressing of the key changes capacitance of the pair of upper and lower conductors for typing or performing a predetermined command; and wherein light emitted by the LED light source is directed to the luminescent layer which in turn directs the light upward toward the key printing film.

2. The keyboard of claim 1, wherein the luminescent layer further comprises a plurality of flanges, each flange being disposed around the cavity and urged against the capacitive layer therebelow.

3. The keyboard of claim 1, wherein the key printing film further comprises a plurality of projections thereon, the projections having oblique or curve lines marked thereon as a key touch guide.

4. The keyboard of claim 1, wherein the LED light source comprises a plurality of LED members each enclosed by an opaque case having an aperture facing the luminescent layer so that light emitted by the LED members passes the apertures to the luminescent layer.

5. The keyboard of claim 1, further comprising a sliding button for mouse and keyboard modes switching on the keyboard housing proximate to the keyboard.

6. A keyboard mounted on a keyboard housing of a laptop having a hinged cover and a display on an inner surface of the cover, comprising:
- a rectangular key printing film formed of an optically transmissive material and comprising a plurality of keys with characters printed thereon;
- a rectangular luminescent layer formed of optically transmissive silicone rubber, the luminescent layer being mounted below the key printing film and comprising a plurality of spaced bottom cavities, each cavity corresponding to the key thereabove, and a plurality of groups of recesses, each group of recesses being disposed on a top of each of the cavities wherein the recesses of one group have a depth different from that of an adjacent group, and the number of the recesses of one group is different from that of the recesses of the other group;
- an LED (light-emitting diode) light source disposed to a side of the luminescent layer; and
- a capacitive layer mounted below the luminescent layer and comprising an insulative layer and a plurality of pairs of upper and lower conductors;
- wherein each cavity corresponds to the pair of upper and lower conductors therebelow;
- wherein a pressing of the key changes capacitance of the pair of upper and lower conductors for typing or performing a predetermined command; and
- wherein light emitted by the LED light source is directed to the luminescent layer, which in turn directs the light upward toward the key printing film by passing through the recesses.

7. The keyboard of claim 6, wherein the luminescent layer further comprises a plurality of flanges, each flange being disposed around the cavity and urged against the capacitive layer therebelow.

8. The keyboard of claim 6, wherein the depths of the recesses of the groups are gradually increased relative to distances between the cavities and the LED light source, and the numbers of the recesses of the groups are gradually decreased relative to the distances between the cavities and the LED light source.

9. The keyboard of claim 6, wherein the key printing film further comprises a plurality of projections thereon, the projections having oblique or curve lines marked thereon as a key touch guide.

10. The keyboard of claim 6, wherein the LED light source comprises a plurality of LED members each enclosed by an opaque case having an aperture facing the luminescent layer so that light emitted by the LED members passes the apertures to the luminescent layer.

11. The keyboard of claim 6, further comprising a sliding button for mouse and keyboard modes switching on the keyboard housing proximate to the keyboard.

\* \* \* \* \*